United States Patent [19]

Dick et al.

[11] Patent Number: 4,632,799
[45] Date of Patent: Dec. 30, 1986

[54] METHODS FOR FORMING TUBULAR CLOSED-ENDED ARTICLES OF THERMOFORMABLE POLYMER MATERIAL

[75] Inventors: David A. Dick, Wantage; Rickworth Folland, Farringdon; Desmond P. Smith, Oxfordshire; Glyn Staines, Swindon, all of England

[73] Assignee: Metal Box p.l.c., Reading, England

[21] Appl. No.: 672,249

[22] PCT Filed: Mar. 13, 1984

[86] PCT No.: PCT/GB84/00078

§ 371 Date: Nov. 9, 1984

§ 102(e) Date: Nov. 9, 1984

[87] PCT Pub. No.: WO84/03657

PCT Pub. Date: Sep. 27, 1984

[30] Foreign Application Priority Data

Mar. 14, 1983 [GB] United Kingdom ............. 8306936

[51] Int. Cl.[4] ............... B29C 51/08; B29C 51/10; B29C 51/42
[52] U.S. Cl. ............... 264/292; 264/522; 264/550; 264/322; 425/384
[58] Field of Search ............... 264/522, 549, 550, 551, 264/292, 322; 425/384

[56] References Cited

U.S. PATENT DOCUMENTS 2,911,681 11/1959 Distler ............................. 264/292
3,586,748 6/1971 Ayres ............................. 264/550 X
3,757,718 9/1973 Johnson ........................... 264/549 X

FOREIGN PATENT DOCUMENTS 0081451 6/1983 European Pat. Off. .
56-164817 4/1982 Japan .
57-70609 8/1982 Japan .
2085798 5/1962 United Kingdom .

Primary Examiner—Jan Silbaugh
Attorney, Agent, or Firm—Burns, Doane, Swecker & Mathis

[57] ABSTRACT

A tubular article with a closed end is formed from a thermoformable polymer material, e.g. a high molecular weight saturated linear polyester such as polyethylene terephthalate, by forcing a punch (21) through the plane of a pre-heated and clamped sheet (13) of the polymer, centrally within an annular die (10) so as to draw the sheet into tubular form without exerting compressive stresses on the sheet between the punch and die, the punch being maintained at a temperature below the glass transition temperature of the polymer, e.g. by passing cooling fluid through internal passages (16), and being moved at a speed of at least ½ meter per second to effect the drawing. The punch head (21) may be convex or concave to produce a shaped closed end on the article, e.g. for making a pressure-resistant container, and the punch may co-operate with a shaped movable anvil (201) at the end or at an intermediate point in its stroke. Replaceable annular spacers (24) can be used to adjust the point in the punch stroke at which it co-operates with the anvil.

8 Claims, 4 Drawing Figures

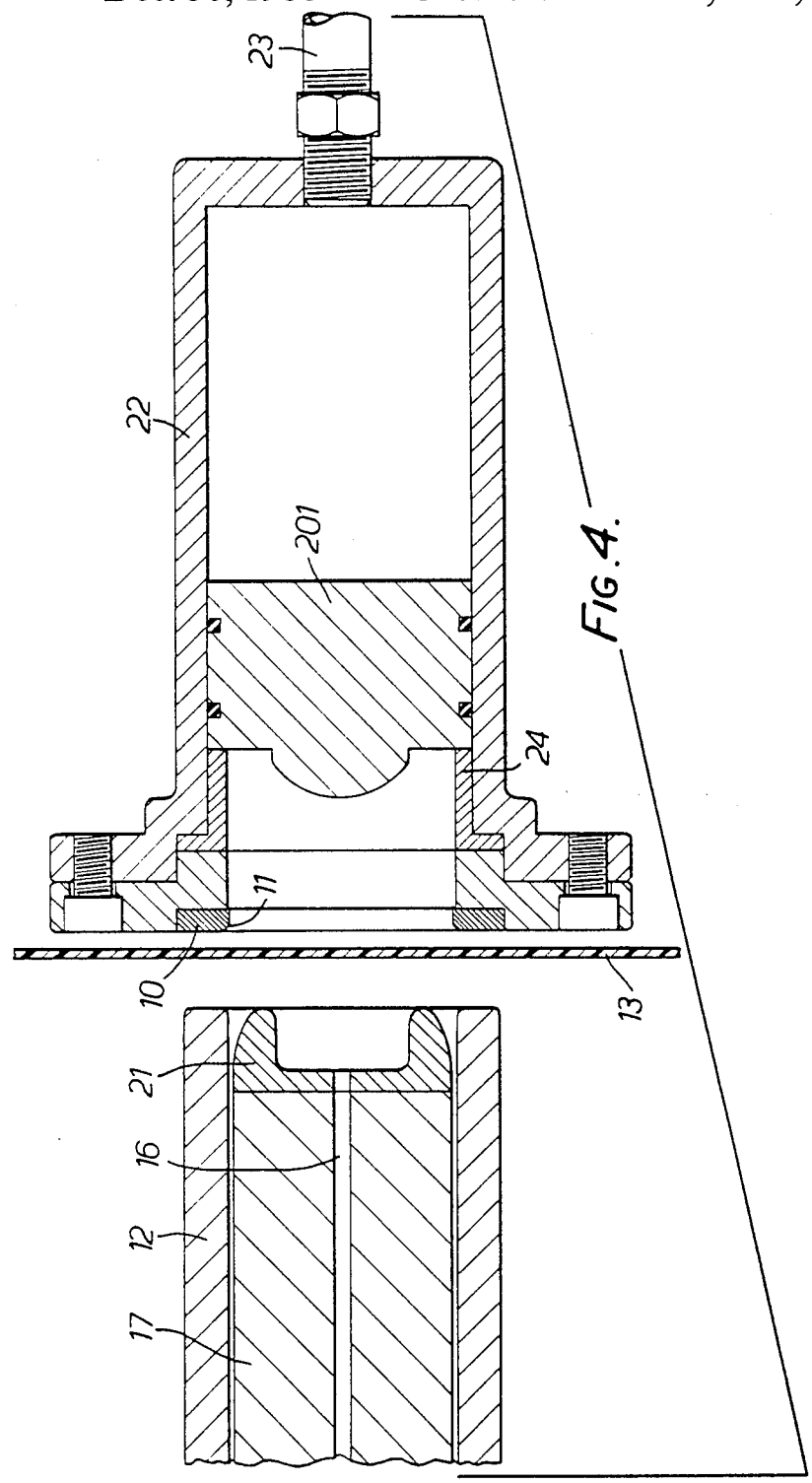

METHODS FOR FORMING TUBULAR CLOSED-ENDED ARTICLES OF THERMOFORMABLE POLYMER MATERIAL

BACKGROUND OF THE INVENTION

1. Field of the Invention

This invention relates to methods and apparatus for forming tubular articles, each with one closed end, from thermoformable polymer materials, particularly but not exclusively high molecular weight saturated linear polyester materials such as polyethylene terephthalate.

2. Discussion of the Prior Art

Various proposals have been made in the past for forming such articles by the technique of plug-forming, in which an annular region of a sheet of the polymer material is clamped and the portion of the sheet within the clamped region is heated to a temperature above the glass transition temperature but below the annealing temperature of the polymer material, and a plug heated to a temperature in the same range is forced through the plane of the sheet at a position centred within the clamped region so as to draw the polymer material into the form of a tubular body with a closed end. The speed of travel of the heated plug has generally been quite slow, e.g. of the order of 0.6 to 0.8 cm per second, resulting in a long production cycle time.

It is an object of the present invention to provide methods and apparatus for forming such articles reliably and effectively in relatively short process times.

SUMMARY OF THE INVENTION

According to the present invention, a method of forming a tubular article with a closed end from a thermoformable polymer material, particularly a high molecular weight saturated linear polyester material, comprises the steps of clamping an annular portion of a sheet of the polymer material, pre-heating at least the portion of the sheet within the annular clamped portion to a temperature above the glass transition temperature of the polymer but below its melting point, and forcing a punch through the plane of the sheet, centrally within an annular die, with a clearance between the punch and die, so as to draw the sheet into tubular form without exerting compressive stresses on the drawn sheet between the side of the punch and the die, wherein the punch is maintained at a temperature below the glass transition temperature of the polymer and is moved at a speed of at least ½ meter per second to effect the drawing. By the glass transition temperature is meant the glass transition temperature of the amorphous and un-oriented polymer. When the thermoformable polymer material is a high molecular weight saturated linear polyester material, the temperature to which the sheet should be pre-heated is below that at which rapid crystallisation of the polyester material begins.

It has surprisingly been found that the use of a relatively cold punch moving at high speed forms the tubular articles in a reliable and effective manner, so long as sufficient clearance is maintained between the punch and die to avoid compressive stresses, while much shorter process cycle times, e.g. of the order of 1 second, can be achieved.

In commercial production where the cycle is repeated at a high rate, the punch is preferably cooled to maintain it at a temperature not exceeding the glass transition temperature of the polymer, preferably not exceeding 35° C. Typically, the punch is moved at a speed not exceeding 5 meters per second to effect the drawing. When using polyethylene terephthalate, the portion of the sheet within the die is preferably pre-heated to a temperature of 90° C. to 110° C. The drawing operation imparts orientation to the polymer material. It is found that the hoop strength of the wall of the tubular article improves as the temperature of the sheet is increased, whereas the axial strength decreases. On the other hand, the thickness of the wall of the tubular article is more uniform when the drawing is effected at lower temperatures. The best combination of relatively uniform thickness and both axial and hoop strength is found when the drawing is effected in this range from 90° C. to 110° C., more particular at 100° C.

Preferably a radiused flange is formed at the mouth of the tubular article by means of a corresponding radius on the mouth of the die. This flange may be used, for example, for seaming a metal end to the mouth of the tubular article, or attaching an end of another material, to form a closed container.

The tubular article may be formed with a shaped, e.g. convex or concave, closed end, for example where it is to be used for a pressure-resistant container. For this purpose, a punch having a shaped head may be employed in conjunction with a correspondingly shaped anvil to form the closed end of the article. Thus a punch having a convex bullet-shaped head may be used, with or without a co-operating anvil, to produce a similarly shaped convex closed end on the tubular article. Alternatively, a punch having a concave head may be used, e.g. in conjunction with a convexly shaped anvil, to form a concave closed end on the tubular article.

The production cycle may be completed by the further step of retracting the punch from the die while admitting gas through a passage in the punch to assist removal of the drawn tubular form from the punch.

Alternatively, the method of the invention may comprise the further step of blowing the drawn tubular form from the punch into a mould cavity by means of gas forced through a passage in the punch. In that case, the mould cavity may be pre-heated to a temperature within the range in which rapid crystallisation and relaxation of the polymer occurs, and the blowing pressure maintained for a sufficient time to effect heat-setting of the article to the dimensions of the mould cavity.

An alternative method of heat setting comprises fitting the drawn tubular form over a mandrel and heating it to a temperature within the range in which rapid crystallisation and relaxation of the polymer occurs and maintaining that temperature for a sufficient time to effect heat-setting of the tubular article to the dimensions of the mandrel.

Where a punch having a shaped nose is employed in conjunction with a correspondingly shaped anvil to form the closed end of the article, the anvil may be movably mounted and the punch may co-operate with the anvil only after a predetermined part of the drawing of the tubular article has been completed, whereafter the punch and anvil move together against a resilient pressure applied to the anvil so as to grip the polymer material forming the closed end between the punch and anvil during the remaining part of the drawing. The resilient pressure applied to the anvil may be provided by gas under pressure in a cylinder in which the anvil forms a movable piston.

The invention also resides in apparatus for forming a tubular article with a closed end from a thermoformable polymer material, comprising an annular die, means for clamping an annular portion of a sheet of the polymer material around the die, means for pre-heating the portion of the sheet within the annular clamped portion to a temperature above the glass transition temperature of the polymer but below its melting point, and a punch movable centrally through the annular die with a clearance therefrom sufficient to avoid applying compressive stresses to the sheet while drawing the sheet into tubular form, wherein the punch is provided with cooling means for maintaining the temperature of the punch below the glass transition temperature of the polymer and means are provided capable of moving the punch at a speed of at least ½ meter per second to effect the drawing. The clamping means may comprise a movable clamping ring whose internal diameter is greater than that of the die. The internal diameter of the clamping ring may be as much as twice that of the die, to allow drawing of the polymer material from the region around the die aperture.

Where the apparatus comprises a punch with a shaped nose and a movable anvil in the form of a piston working in a cylinder, the cylinder may be provided with replaceable annular spacer means for limiting movement of the anvil towards the punch and thereby predetermining the portion of the drawing which must be completed before the anvil can co-operate with the punch. In a convenient construction, the cylinder supports the annular die and the annular spacer means is disposed between the die and the anvil.

Specific embodiments of the invention will now be described by way of example and with reference to the accompanying drawings, in which:

BRIEF DESCRIPTION OF DRAWINGS

FIG. 4 is a cross-sectional view through an alternative form of apparatus incorporating a movable anvil.

DETAILED DESCRIPTION OF THE PREFERRED EMBODIMENTS

Figure 1:
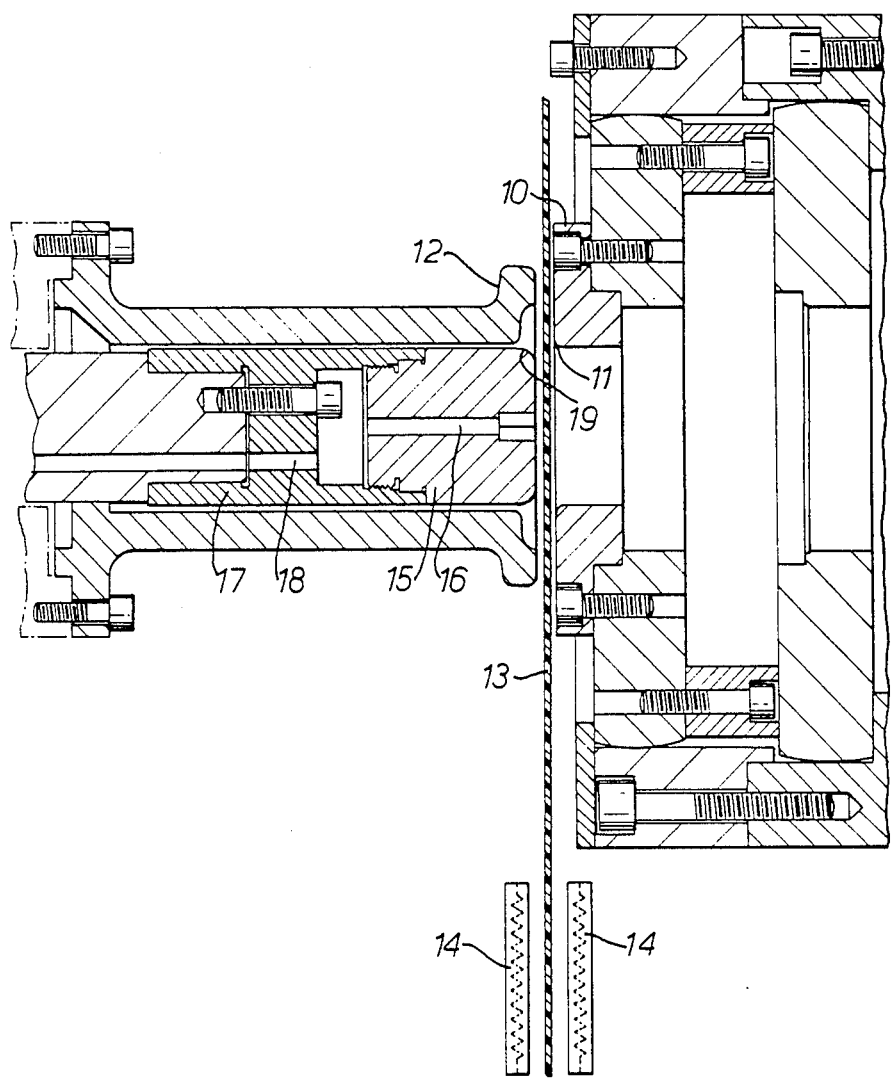
FIG. 1 is a cross-sectional view through an apparatus in accordance with the invention.

The apparatus illustrated in the drawings is intended for producing tubular containers, each with an integral closed end, from a thermoformable polymer material. It is particularly intended for use with a high molecular weight saturated linear polyester material such as polyethylene terephthalate, but it has also been used successfully with other thermoformable polymer materials such as polypropylene.

The apparatus shown in FIG. 1 comprises an annular die 10 with a radiused mouth 11 and a clamping ring 12 whose internal diameter is larger than that of the die 10. By axial movement of the clamping ring 12, to the right in FIG. 1, a sheet of polymer 13 can be clamped to the die 10. Infra-red heaters, shown diagrammatically at 14, are disposed adjacent to the die 10 so as to heat at least the portion of the polymer sheet 13 which is to be within the clamped region to a temperature of 90° C. to 110° C. (preferably 100° C.) before it is moved into position and clamped by the clamping ring 12.

A punch 15 is movable axially within the clamping ring 12 and centrally through the aperture of the annular die 10. When using polyethylene terephthalate, the clearance between the punch 15 and die 10 must be equal to at least ⅓ of the thickness of the sheet 13, in order to avoid exerting compressive stresses on the sheet when it is drawn between the side of the punch 15 and the inner surface of the die 10. It will be understood that the drawing process thins out the sheet 13 to a considerable extent and it has been found that a clearance of only just over ⅓ of the thickness of the PET sheet is sufficient to avoid such compressive stresses or "wall ironing". Wall ironing must be prevented, because otherwise the polymer material will be found to break or to be formed into holes during the drawing process of the present invention.

The punch 15 is formed with a central passage 16 and is secured in a punch carrier 17 also provided with a passage 18, so that air can be admitted through the punch when desired. The punch carrier 17 is connected to means (not shown) capable of moving the punch at a speed of at least ½ meter per second, and typically up to 5 meters per second, to effect the drawing.

In practice, when a sheet 13 of the polymer material has been heated to the desired temperature of 100° C., placed in position, and clamped by the clamping ring 12, the punch 15 is forced through the aperture of the die 10 at a speed of at least ½ meter per second and preferably from 1.5 to 2 meters per second to draw the polymer material sheet into the desired tubular form. The punch velocity is constant over 95% of the length of its stroke. Material to form the wall of the article is drawn partly from the closed end at the head of the punch and partly from the material around the mouth of the die, within the clamping ring 12, which may be up to twice the diameter of the die to provide sufficient material for forming the walls. The drawing causes orientation of the material in known manner.

The punch 15 is maintained at a temperature below the glass transition temperature of the amorphous and unoriented polymer, which is around 70° C. for polyethylene terephthalate depending on the intrinsic viscosity of the polymer. The temperature of the punch 15, when using PET, is maintained preferably below 35° C., e.g. by gas supplied through passages 18 and 16 or by fluid supplied through other cooling passages (not shown). The polymer material is rapidly cooled by contact with the punch 15, shrinkage and thermal contraction of the polymer serving to ensure and maintain good thermal contact between the polymer material and the punch. On completion of the drawing stroke of the punch 15, it is retracted while air is admitted through passages 18 and 16 so that the formed tubular article can be removed once the clamping ring 12 has also been retracted. The radius 11 on the die 10 results in the formation of a correspondingly radiused flange on the mouth of the tubular article. After trimming the external diameter of the flange, this can be used for seaming to a metal end or closure or attachment to another closure in known manner for the production of a closed container.

With the flat headed punch 15 shown in FIG. 1, the drawing of material from the closed end of the article is determined by the radius of the corners 19 of the punch. It is preferred to use a radius of approximately 3 mm in order to ensure that sufficient material will be drawn from the closed end to provide adequate wall thickness.

Figure 2:
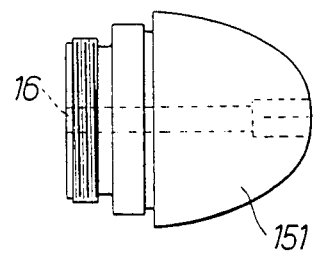
FIG. 2 is an elevation of an alternative shape of punch head.

For the production of a pressure resistant container, one may replace the flat punch head shown in FIG. 1 by a convexly curved bullet-shaped punch 151 as illustrated in FIG. 2, to produce a correspondingly convexly curved pressure resistant end to the article. Alternatively a concave pressure-resistant end may be produced, using a concave punch head, e.g. with reduced pressure applied through passages such as those shown at 16,18 in FIG. 1.

For shaping the closed end of the article, a punch with a shaped nose may be used in conjunction with an anvil of corresponding shape, to produce a closed end of convex or concave form.

Figure 3:
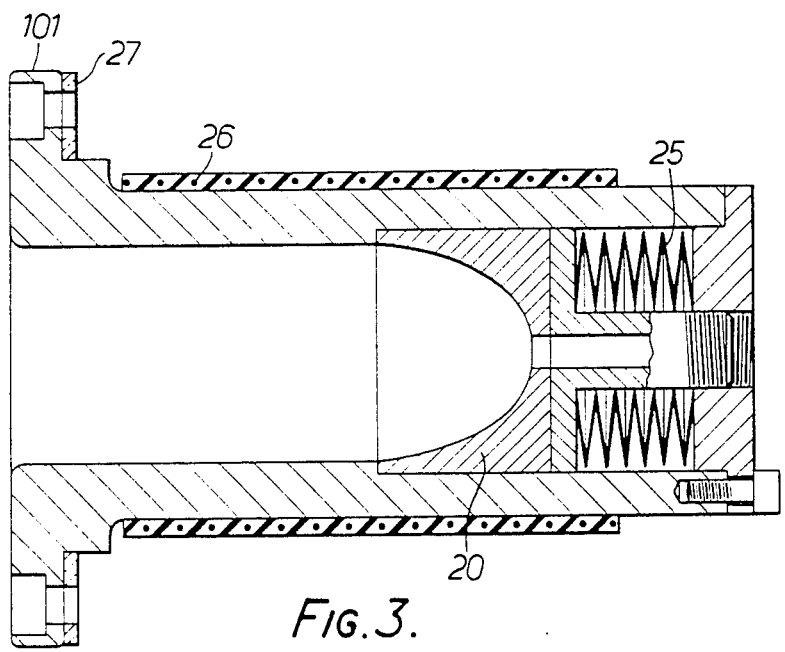
FIG. 3 is a cross-sectional view through an alternative form of die, having secured to it an anvil which can alternatively be used as a heat-setting mould.

FIG. 3 illustrates a die 101 which is extended axially as compared with the die 10 of FIG. 1 and which carries a concave anvil 20, corresponding in shape to punch 151 of FIG. 2 and axially movable in the extension of die 101 against a spring 25. On completion of the stroke of punch 151, it co-operates with anvil 20 to form a convex closed end on the tubular form. The spring 25 allows the anvil 20 to move slightly to cushion the engagement.

The apparatus of FIG. 3 can alternatively be used as a mould for heat-setting the tubular article. For this purpose, a heating element 26 comprising resistance heating wires in an insulating jacket is provided around the extended die 101 to heat it to a temperature within the range in which rapid crystallisation and relaxation of the polymer occur, and a heat insulating washer 27 is provided to reduce loss of heat from the die 101 to the remainder of the apparatus. In this case, on completion of the stroke of the punch 151, some play is allowed between the drawn tubular form on the punch 151 and the interior of the mould formed by the anvil 20. The drawn tubular form is blown from the punch into the mould cavity formed by the anvil 20 by means of gas forced through passage 16 in the punch, and the blowing pressure is maintained for a sufficient time to effect heat-setting of the article to the interior dimensions of the mould cavity.

FIG. 4 illustrates the use of a base forming anvil 201 in combination with a recessed punch nose 21 to form a concave pressure resistant closed end or bottom on the article. In this embodiment, the die 10 and clamping ring 12 are of basically similar construction to those of FIG. 1 and the polymer sheet 13 is held and heated in the same manner. The anvil 201 is here shown as movably mounted as a piston in a cylinder 22 and resiliently urged towards the punch 21. The means for applying resilient pressure to the anvil could be a simple spring as in FIG. 3 but in this case is illustrated as consisting of means 23 for supplying compressed air to the interior of the cylinder 22. The anvil is arranged to co-operate with the punch 21 only after a predetermined portion of the drawing of the tubular article has been completed. For this purpose, the cylinder 22 is provided with replaceable annular spacer means 24 for limiting movement of the anvil 201 towards the punch 21 and thereby predetermining the portion of the drawing which must be completed before the anvil can co-operate with the punch. In the construction illustrated, the cylinder 22 supports the die 10 and the spacer 24 is disposed between the die 10 and the anvil 201. By choice of an appropriate length of spacer 24, the thickness of the concave base or closed end produced on the article can be controlled, because drawing of polymer material from the base ceases at the stage when the punch co-operates with the anvil. A range of shapes for the closed end or base can be produced by choice of appropriate shapes of the punch nose 21 and anvil 201.

The method and apparatus described above can be used with polymer materials other than polyethylene terephthalate, such as other high molecular weight saturated linear polyesters, homopolymers and copolymers of polypropylene, and laminated materials incorporating gas barrier layers.

What is claimed is:

1. A method of forming a tubular article with a closed end from a thermoformable polymer material which is a crystallisable polymer material, comprising the steps of pre-heating at least a portion of the sheet of that crystallisable, thermoformable polymer material to a temperature above the glass transition temperature of the polymer but below its melting point and below that temperature at which rapid crystallisation of the polymer material begins, clamping an annular region of the sheet surrounding the said portion, forcing a punch through the plane of the sheet, centrally within an annular die with a clearance between the punch and die, so as to draw the heated portion of the sheet into tubular form without exerting compressive stresses on the drawn sheet between the side of the punch and the die, maintaining the punch at a temperature below the glass transition temperature of the polymer, and moving the punch at a speed of at least ½ meter per second to effect the drawing.

2. A method according to claim 1, wherein the punch is cooled to maintain it at a temperature below the glass transition temperature of the polymer.

3. A method according to claim 2, wherein the punch is maintained at a temperature not exceeding 35° C.

4. A method according to claim 1, wherein the polymer material is polyethylene terephthalate and the said portion of the sheet is pre-heated to a temperature of 90° C. to 110° C.

5. A method according to claim 1, wherein a radiused flange is formed at the mouth of the tubular article by means of a corresponding radius on the mouth of the die.

6. A method according to claim 1, wherein a punch having a shaped head is employed in conjunction with a corresponding shaped anvil to form the closed end of the article.

7. A method according to claim 6, wherein a punch having a convex bullet-shaped head is used to produce a similarly shaped convex closed end on the tubular article.

8. A method according to claim 6, wherein the anvil is movably mounted and the punch co-operates with the anvil only after a predetermined part of the drawing of the tubular article has been completed, whereafter the punch and anvil move together against a resilient pressure applied to the anvil so as to grip the polymer material forming the closed end between the punch and anvil during the remaining part of the drawing, the resilient pressure applied to the anvil being provided by gas under pressure in a cylinder in which the anvil forms a movable piston.

* * * * *